United States Patent
Liang et al.

(10) Patent No.: US 7,323,672 B2
(45) Date of Patent: Jan. 29, 2008

(54) LIGHT SENSOR STRUCTURE WITH DARK CURRENT COMPENSATION

(75) Inventors: Wenbo Liang, Sindian (TW); Yuh-Min Lin, Sindian (TW)

(73) Assignee: Capella Microsystems Corp., Totola (VG)

( * ) Notice: Subject to any disclaimer, the term of this patent is extended or adjusted under 35 U.S.C. 154(b) by 44 days.

(21) Appl. No.: 11/174,456

(22) Filed: Jul. 6, 2005

(65) Prior Publication Data

US 2006/0180747 A1  Aug. 17, 2006

Related U.S. Application Data

(60) Provisional application No. 60/666,589, filed on Mar. 31, 2005, provisional application No. 60/653,507, filed on Feb. 17, 2005, provisional application No. 60/653,505, filed on Feb. 17, 2005.

(51) Int. Cl.
*G01J 1/44* (2006.01)
*H05B 37/02* (2006.01)
*H05B 39/04* (2006.01)

(52) U.S. Cl. ............................................. 250/214 AL
(58) Field of Classification Search ......... 250/214 AL, 250/214 B, 214 C; 330/277; 327/514
See application file for complete search history.

(56) References Cited

U.S. PATENT DOCUMENTS

| | | | | |
|---|---|---|---|---|
| 4,030,829 A | * | 6/1977 | Hooper | 356/325 |
| 4,808,810 A | * | 2/1989 | Van Doorn | 250/214 A |
| 5,027,117 A | * | 6/1991 | Yoshida et al. | 341/132 |

* cited by examiner

*Primary Examiner*—Georgia Epps
*Assistant Examiner*—Suezu Ellis
(74) *Attorney, Agent, or Firm*—Rosenberg, Klein & Lee

(57) ABSTRACT

The ambient light sensor structure includes a power supply, a converter, and a pulse processing unit. The power supply provides a reference voltage interface, a high voltage interface and a low voltage interface. The converter includes a first current-to-pulse converter, a second current-to-pulse converter, a first light sensor and a second light sensor. The pulse processing unit comprises a signal subtraction component for circuit blocking, a counter, a digital-to-analog converter and a buffer by series connection. Without incident light, two light sensors would produce a dark current due to the material characteristics of the two photo diodes. Therefore, two current to pulse converters convert the dark current into a pulse signal and transmit the pulse signal to the signal subtraction component in order to cancel the dark current. By the method mentioned above, the dark current caused by the material characteristic of the two light sensors can be eliminated.

9 Claims, 6 Drawing Sheets

LIGHT SENSOR STRUCTURE WITH DARK CURRENT COMPENSATION

CROSS REFERENCE TO RELATED APPLICATIONS

This application is based upon U.S. Provisional Application No. 60/653,507 filed 17 Feb. 2005; U.S. Provisional Application No. 60/653,505 filed 17 Feb. 2005; and U.S. Provisional Application No. 60/666,589 filed 31 Mar. 2005.

FIELD OF THE INVENTION

The present invention generally relates to an ambient light sensor structure and its circuit characteristic, and more particularly relates to an ambient light sensor structure that eliminates dark current in order to be able to work at high temperatures.

BACKGROUND OF THE INVENTION

The photo diode without incident light releases a dark current. In other words, without the incident light the ambient light sensor still produces the output. Because of the influence of dark current, most of ambient light sensors are unable to work at high temperatures, especially above 50° C. Therefore, this invention provides a circuit structure in order to effectively eliminate a dark current so that the ambient light sensor can work at 85° C.

SUMMARY OF THE INVENTION

The primary objective of the present invention is to provide an ambient light sensor that can compensate for the dark current, comprising: a power supply, a converter, and a pulse processing unit. The power supply provides three types of voltage interfaces to the converter including a reference voltage interface, a high voltage interface and a low voltage interface. The converter comprises a first current-to-pulse converter, a second current-to-pulse converter, a first light sensor, and a second light sensor. The pulse process unit comprises a signal subtraction component, a counter, a digital-to-analog converter and a buffer by series connection.

Because of the influence of material characteristics of the first light sensor and the second light sensor from the converter, both light sensors also produce two dark currents, without the illumination of incident light. Both the first current-to-pulse converter and the second current-to-pulse converter convert the dark current into a pulse signal. Since the number of pulse signals that are caused by the two light sensors are equal, after a signal subtraction component, the pulse process unit produces zero output voltage. Thus, by the method mentioned above, the dark current that is produced by the material characteristics of the first light sensor and the second light sensor can be eliminated.

BRIEF DESCRIPTION OF THE DRAWINGS

These and other features of the present invention will become clearer from the following description of the preferred embodiments given with reference to the attached drawings, in which.

DETAILED DESCRIPTION OF THE PREFERRED EMBODIMENTS

Figure 1:
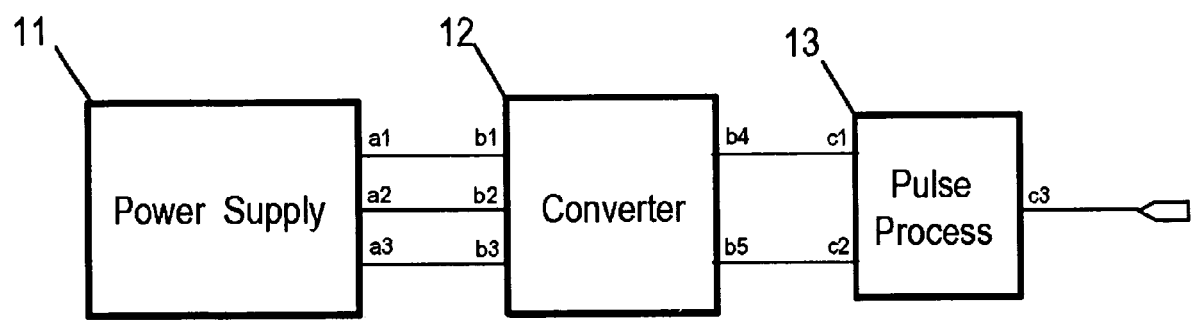
FIG. 1 is a block diagram of an example of an ambient light sensor structure according to an embodiment of the present invention.

Preferred embodiments of the present invention will be explained below with reference to the drawing.

FIG. 1 shows an example of an ambient light sensor structure according to an embodiment of the present invention. The ambient light sensor structure comprises a power supply 11, a converter 12, and a pulse processing unit 13. The power supply 11 provides three types of voltage interfaces: first is a reference voltage interface a1, second is high voltage interface a2, and last is low voltage interface a3. The converter 12 includes five interfaces: a first input b1, a second input b2, a third input b3, a first output b4, and a second output b5. The pulse process unit 13 includes three interfaces: a first input c1, a second.

Figure 2:
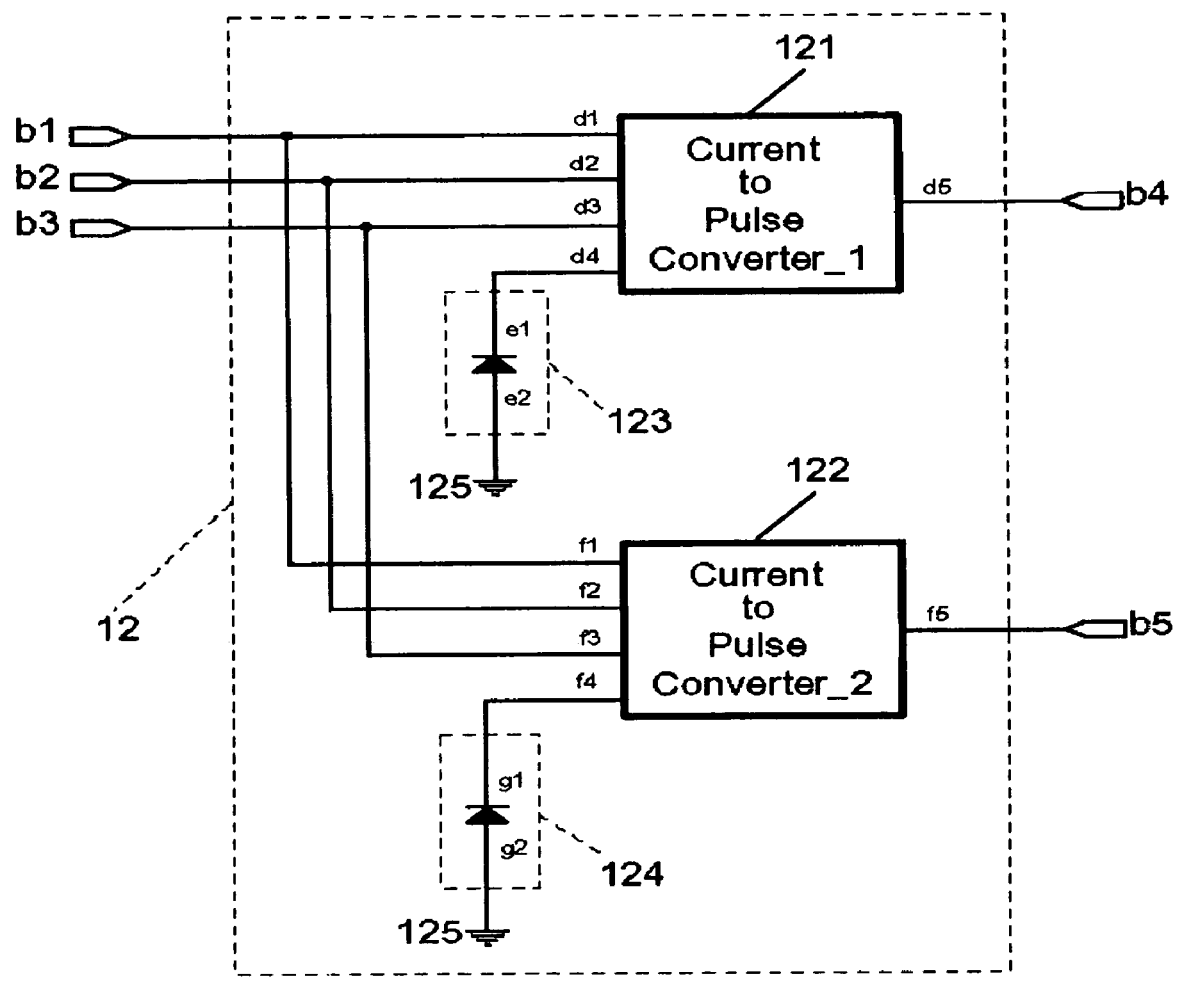
FIG. 2 is a view explaining an example of the composition of a converter of an ambient light sensor structure according to an embodiment of the present invention.

Next, the composition of the converter 12 will be explained. FIG. 2 schematically shows an example of the converter 12.

As shown in FIG. 2, the converter 12 also comprises a first current-to-pulse converter 121, a second current-to-pulse converter 122, a first light sensor 123, a second light sensor 124, and a common ground 125. Both the first current-to-pulse converter 121 and the second current-to-pulse converter 122 include a first input d1, H, a second input d2, f2, a third input d3, f3, a fourth input d4, f4 and a first output d5, f5. Both the first light sensor 123 and the second light sensor 124 include a N-type e1, g1 and a P-type e2, g2.

Figure 3:
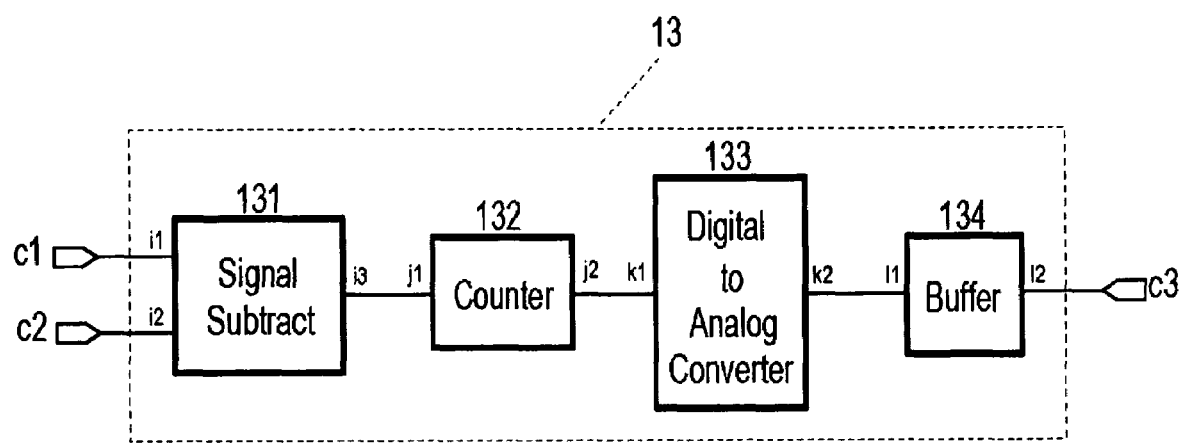
FIG. 3 is a view explaining an example of the composition of a pulse process unit of an ambient light sensor structure according to an embodiment of the present invention.

Next, the composition of the pulse processing unit 13 will be explained. FIG. 3 is an example of the pulse processing unit 13, further comprising a signal subtraction component 131, a counter 132, a digital-to-analog converter 133, and a buffer 134. The signal subtraction component 131 includes a first input i1, a second input i2, and a first output i3. The counter 132 includes a first input j1 and a first output j2. The digital-to-analog converter 133 includes a first input k1 and a first output k2. The buffer 134 includes a first input l1 and a first output l2.

Next, the relationship among the power supply 11, the converter 12, and the pulse processing unit 13 will be explained. Please refer to FIG. 1, the reference voltage interface a1 of the power supply 11 couples to the first input b1 of the converter 12, the high voltage interface a2 of the power supply 11 couples to the second input b2 of the converter 12, the low voltage interface a3 of the power supply 11 couples to the third input b3 of the converter 12, the first output b4 of the converter 12 couples to the first input c1 of the pulse processing unit 13, the second output b5 of the converter 12 couples to the second input c2 of the pulse processing unit 13 and the first output c3 of the pulse processing unit 13 will obtain a value of the current.

Please refer to FIG. 2, the first current-to-pulse converter 121 and the second current-to-pulse converter 122 have three power supply interfaces as the power supply 11, including a reference voltage interface d1, f1, a high voltage interface d2, f2, and a low voltage interface d3, f3. The reference voltage interface d1, f1 of the first current-to-pulse converter 121 and the second current-to-pulse converter 122 couples to the first input b1 of the converter 12, the high voltage interface d2, f2 couples to the second input b2 of the converter 12, and the low voltage interface d3, 13 couples to the third input b3 of the converter 12. The fourth input d4 of the first current to pulse converter 121 couples to the N-type e1 of the first light sensor 123. The fourth input f4 of the second current to pulse converter 122 couples to the N-type g1 of the second light sensor 124. The P-type e2 of the first light sensor 123 couples to the common ground 125. The P-type g2 of the second light sensor 124 couples to the common ground 125. The first output d5 of the first current-to-pulse converter 121 couples to the first output b4 of the converter 12. The first output f5 of the second current-to-pulse converter 122 couples to the second output b5 of the converter 12.

Please refer to FIG. 3, the first input ii of the signal subtraction component 131 couples to the first input c1 of the pulse processing unit 13, the second input i2 of the signal subtract component 131 couples to the second input c2 of the pulse processing unit 13. The first output i3 of the signal subtraction component 131 couples to the first input j1 of the counter 132, the first output j2 of the counter 132 couples to the first input k1 of the digital to analog converter 133, the first output k2 of the digital-to-analog converter 133 couples to the first input l1 of the buffer 134, and the first output l2 of the buffer 134 couples to the first output c3 of the pulse processing unit 13.

Figure 4:
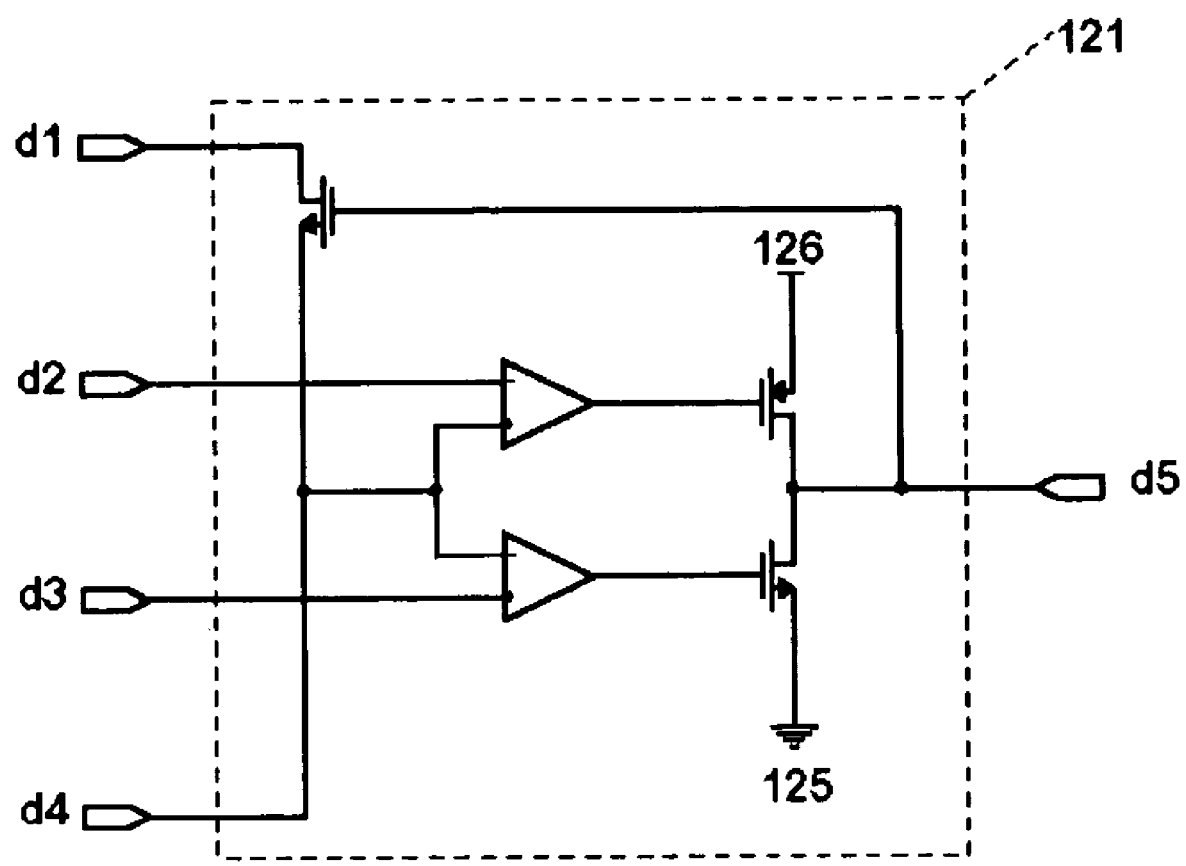
FIG. 4 is a view explaining an example of the composition of a first current to pulse converter of an ambient light sensor structure according to an embodiment of the present invention.
Figure 5:
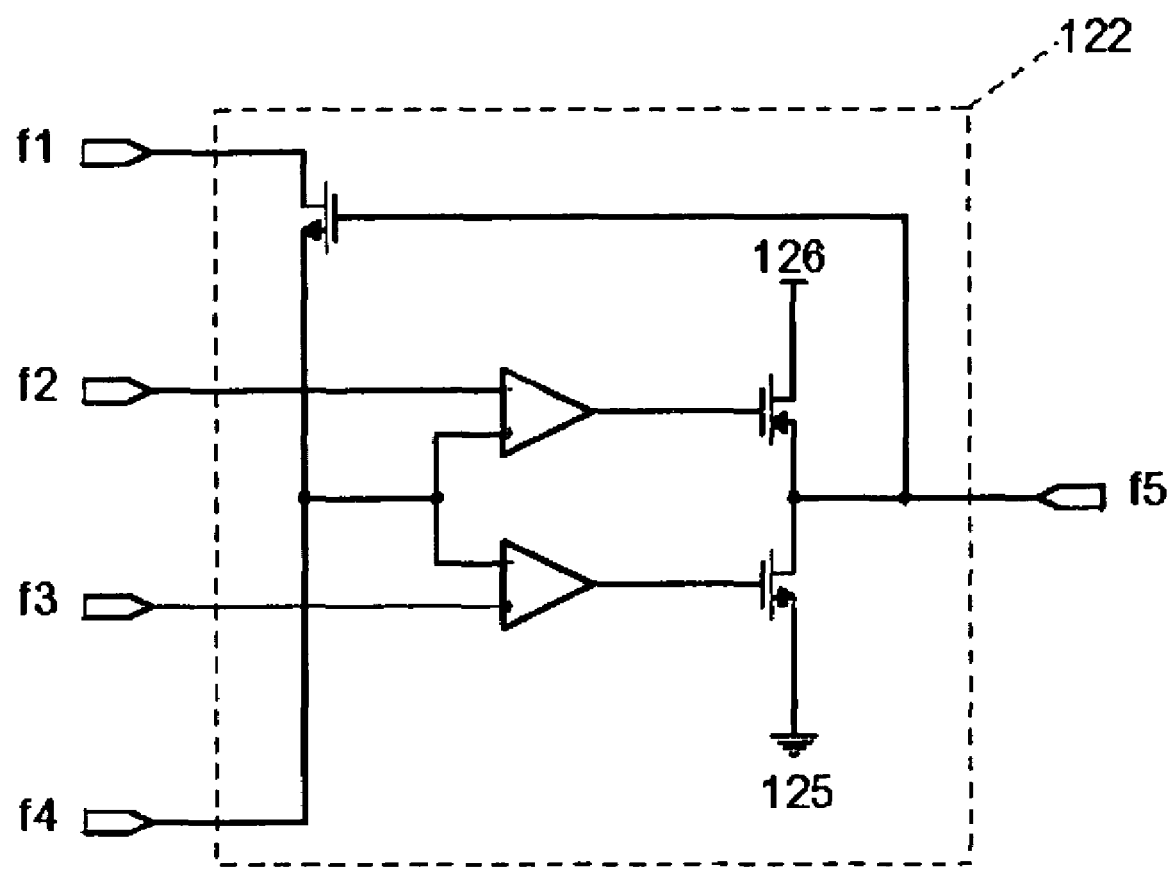
FIG. 5 is a view explaining an example of the composition of a second current to pulse converter of an ambient light sensor structure according to an embodiment of the present invention.

FIG. 4 shows an example of the composition of the first current-to-pulse converter 121 and FIG. 5 shows an example of the composition of the second current-to-pulse converter 122. Both the first current-to-pulse converter 121 and the second current-to-pulse converter 122 comprise a Metal Oxide Semiconductor Field Effect transistor, a first comparator, a second comparator, a first switch, and a second switch. In accordance with the method of couple as shown in FIG. 4 and FIG. 5 obtained the first current to pulse converter 121 and the second current-to-pulse 122.

Figure 6:
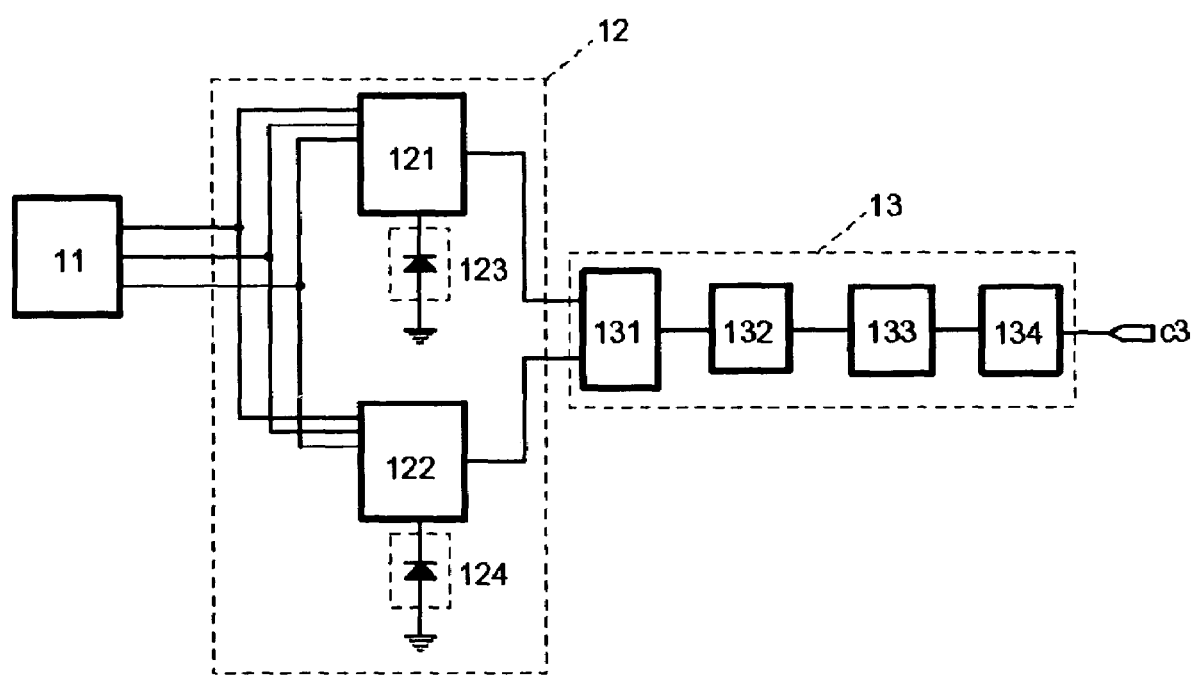
FIG. 6 is a block diagram of an example to accomplish an ambient light sensor structure by a method of couple according to an embodiment of the present invention.

Finally, FIG. 6 shows a block diagram of an example explaining the coupling method that is used to accomplish the ambient light sensor structure. By way of the buffer 134, the output could obtain a value of voltage; the value of the voltage and the luminosity of the incident light are a direct ratio. Without any incident light, both the first light sensor 123 and the second light sensor 124 would produce two dark currents due to the material characteristic of two photo diodes 123, 124. Therefore, both the first current-to-pulse converter 121 and the second current-to-pulse converter 122 convert the dark current into signal pulse. The number of pulses that are caused by the two photo diodes 123, 124 are the same and then transmit the pulses to the signal subtraction component 131 in order to obtain a pulse signal with a zero value. By the method mentioned above, the dark current that is caused by the material characteristic of the first light sensor 134 and the second light sensor 124 can be eliminated.

In summation of the description above, the present invention is novel and useful and definitely enhances the performance over the conventional structure and further complies with the patent application requirements and is submitted to the Patent and Trademark Office for review and granting for the commensurate patent rights.

What is claimed is:

1. An ambient light sensor structure, comprising:
   a pair of light sensors for providing a current responsive to impingement of incident light thereon, each of said light sensors providing a dark current absent said impingement of incident light thereon;
   a power supply, said power supply providing at least one group of voltage interfaces;
   a converter coupled to said pair of light sensors and said power supply, said converter including a pair of current to pulse converters respectively coupled to said pair of light sensors, each of said pair of current to pulse converters having a plurality of first inputs coupled to said group of voltage interfaces and a second input coupled to a corresponding one of said light sensors, each of said pair of current-to-pulse converters providing output pulse signals responsive to said current of said corresponding light sensor, wherein said output pulse signals of each of said pair of current-to-pulse converters include an equal number of output pulse signals in said absence of impingement of incident light on said pair of light sensors representing said dark current of said pair of light sensors; and
   a pulse processing unit having a pair of inputs respectively coupled to said output pulse signals of said pair of current-to-pulse converters and providing an output voltage corresponding to a luminosity of the incident light with said dark current nulled.

2. The ambient light sensor structure of claim 1, wherein said group voltage interfaces of said power supply comprises at least three voltage interfaces, each voltage interface being a different voltage from the others.

3. The ambient light sensor structure of claim 2, wherein each said current-to-pulse converter comprises at least one Metal Oxide Semiconductor Field Effect transistor coupled between one of said voltage interfaces and said corresponding light sensor, said Metal Oxide Semiconductor Field Effect transistor having a gate electrode coupled said output pulse signals of said current-to-pulse converter.

4. The ambient light sensor structure of claim 1, wherein each said current-to-pulse converter includes a pair of switches having an output node therebetween providing said output pulse signals.

5. The ambient light sensor structure of claim 1, wherein each said light sensor is made of a material that converts light into current.

6. The ambient light sensor structure of claim 1, wherein said pulse processing unit includes at least one signal subtraction component having a pair of inputs respectively coupled to said output pulse signals of said pair of current-to-pulse converters for nulling said dark current.

7. The ambient light sensor structure of claim 1, wherein said pulse processing unit includes at least one counter coupled to an output of said signal subtraction unit.

8. The ambient light sensor structure of claim 7, wherein said pulse processing unit includes at least one digital-to-analog converter coupled to an output of said counter.

9. The ambient light sensor structure of claim 8, wherein said pulse processing unit includes at least one buffer coupled to an output of said digital-to-analog converter.

* * * * *